April 22, 1969 W. R. JOHNSON 3,440,339
COLOR TELEVISION RECORDING SYSTEM
Filed June 10, 1966
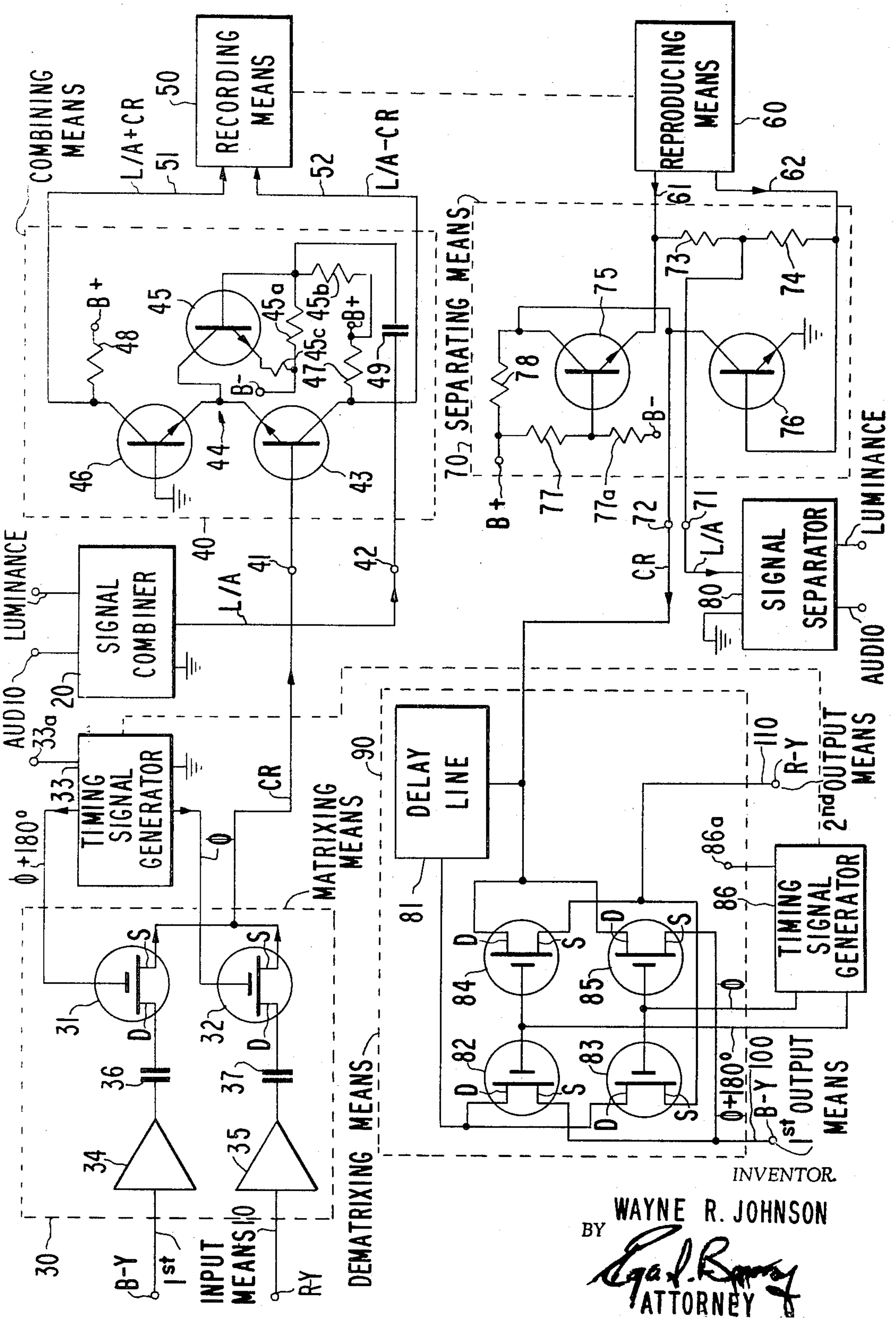
INVENTOR.
WAYNE R. JOHNSON
BY
ATTORNEY United States Patent Office
3,440,339
Patented Apr. 22, 1969

3,440,339

COLOR TELEVISION RECORDING SYSTEM

Wayne R. Johnson, Woodland Hills, Calif., assignor, by mesne assignments, to United Control Corporation, Redmond, Wash., a corporation of Delaware Filed June 10, 1966, Ser. No. 556,695
Int. Cl. H04n 1/46, 5/44, 9/02
U.S. Cl. 178—5.2 19 Claims

ABSTRACT OF THE DISCLOSURE

There is disclosed a recording system for recording color television signals including means for converting these signals to signals better adapted for recording and reconverting them into their original form for display. Means for matrixing color difference signals and for combining the matrixed and luminance signals is disclosed.

The subject invention relates to a recording system for recording signals transmitted in accordance with FCC standards and adapted to be displayed on the screen of a color television receiver. More specifically, the system of the invention includes a means for processing these signals which are not well adapted for recording to convert them to signals better adapted for recording and to reconvert them into their original form for displaying.

In conventional tape recording systems used for television (both monochrome and color) the composite broadcast signal itself is recorded onto magnetic tape. No attempt is normally made to process the composite signal in any special way for recording. In most conventional systems, the composite signal is used to frequency modulate a carrier signal which is recorded onto magnetic tape using a rotary head magnetic recorder. While such a system is commercially acceptable for recording systems used by broadcast stations and networks, the system is too costly and too complex for use, for example, in less expensive home video recorders. The purpose of the subject invention is to provide a system which may be used for home recording of color television signals, as well as other applications enumerated later.

One criterion for a home color video recorder is that the system should be compatible with monochrome recording. In other words, the recorder should be capable of recording and reproducing both black and white and color television signals. Various systems for color television recording have been considered. One such system, which does satisfy the criterion of being compatible with color and monochrome recording, is a system which records the color information on one track of a magnetic tape and the luminance-audio information (the necessary monochrome information) on a separate track. Such a system, however, has a severe disadvantage during monochrome recording. During monochrome recording, the color track—the track having the color on chrominance information—is not used at all. Thus, only one-half of the tape area is utilized, resulting in a reduction in signal-to-noise ratio of about 3 db.

The subject invention provides a means for processing color television signals so that they may be recorded on magnetic tape in a fashion compatible with monochrome recording, yet making use of the entire tape area even when monochrome signals alone are being recorded. The system of this invention is adapted for recording signals to be displayed on the screen of a color television receiver. The system is adapted for converting the signals to signals better adapted for recording, and for reconverting them substantially to their original form, and comprises: first input means for receiving a pair of signals together representative of the chroma difference information of a color television signal; matrixing means coupled to said first input means for combining the pair of signals into a combined signal which is capable of being reconverted substantially to the original pair of signals; a second input means for receiving a signal representative of luminance information; combining means coupled to said matrixing means and second input means for further combining the combined signal and the signal representing luminance information; recording means coupled to the combining means for recording the further-combined signal onto a recording medium; a reproducing means for reproducing the further-combined signal from the recording medium; separating means coupled to the reproducing means for separating the original combined signal from the further-combined signal; and dematrixing means coupled to the separating means for separating the combined signal substantially into a pair of signals together representative of the chroma difference information of a color television signal, such dematrixing means having a first and second output means individual to the pair of signals, the pair of signals being capable of being processed in a conventional color television receiver.

The invention will be described in more detail with reference to the drawing, in which the single figure is a schematic and block diagram of the recording system of a preferred embodiment of the invention. Initially, the invention will be explained with respect to the recording and reproducing of color television information. After the invention is thus explained, its applications to monochrome and stereophonic information will be described.

A standard NTSC color television signal is a composite of three important portions. The first portion is the color or "chroma" information. Depending on the particular type of color television receiver employed, such information as derived by the receiver may take different forms. However in almost all instances, the information is contained in a pair of chroma difference signals. These are commonly known as "X" and "Z" signals or "$B-Y$" and "$R-Y$" signals, or other similar pairs of difference signals. The $B-Y$ and $R-Y$ signals have been chosen as representative examples in the description which follows. The next portion of the color television signal is the luminance information. This information determines the intensity of the beam striking the raster. It is present in both monochrome and color signals and determines overall brightness of each part of the picture. Finally the third portion of the signal is the audio portion which is used to reproduce the television sound.

The chroma difference signals are fed to the first input means 10. The audio and luminance information are together fed to signal combiner 20. The audio signal in the example used in the preferred embodiment of the invention is a suppressed-carrier, amplitude-modulated, time division multiplexed sound signal. This signal, multiplexed with the video sync, appears at one input of signal combiner 20. Signal combiner 20 adds the audio signal to the horizontal blanking portion of the luminance signal. The derivation of the audio signal as well as the details of the combiner is described in copending application Ser. No. 374,632, filed June 12, 1964, now Patent No. 3,335,218 and assigned to the same assignee as this invention. Obviously, many other forms of combination between audio and luminance signals may be employed without departing from the scope of the invention. Moreover, if desired, the audio signal may be recorded on a separate channel of tape and be entirely separate from the chroma and luminance information processed according to this invention.

The chroma difference signals at input means 10 are passed to matrixing means 30 where they are combined into a single, time-shared chroma signal in a manner to be described in more detail later. This combined signal is labeled "CR" on the drawing. The combined audio and luminance signals coming out of signal combiner 20 are hereinafter called the "*L/A*" signal. The CR and *L/A* signals are together passed to input terminals 41 and 42, respectively, of combining means 40. There they are further combined in accordance with the invention in a manner to be described in more detail later. The further-combined signals from combining means 40 are passed to recording means 50 for recording onto a conventional recording medium. Recording means 50 may be a magnetic tape recorder, a disc recorder, or other conventional means for recording signals. It is observed that the signal from combining means 40 appears in two portions. One portion appears on line 51 and the other portion on line 52. The signals on lines 51 and 52 together represent a further-combined signal which may be amplified by conventional record amplifiers in recording means 50 and recorded onto a recording medium. In a preferred embodiment of the invention, recording means 50 is a magnetic tape recorder, and the signals on lines 51 and 52 are recorded on a single split track using a split track recording head, as is well known in the art. Each track is about one-fourth of the width of a one-quarter inch tape. Each portion of a split track is thus about one-eighth inch wide.

A split track reproducing head in reproducing means 60 will separately reproduce the two signals on lines 51 and 52; however a single track reproducing head, covering the entire one-quarter inch width of the track, will reproduce the combined signals appearing on lines 51 and 52. The separately reproduced signals from a split-track head appear on lines 61 and 62; these are the same two signals passed to recording means 50 on lines 51 and 52, respectively. However, if a single track reproduce head is used in recording means 60 which combines the split track, the same signal, which is a combination of the signals on lines 51 and 52, appears on both lines 61 and 62.

The further-combined signal from reproducing means 60 is passed through lines 61 and 62 to separating means 70 for separating the combined signal *L/A* from the further-combined signal, *L/A*—*CR* in a manner to be described later. The separated signals from separating means 70 are again the *L/A* and CR signals, as shown at the output terminals 71 and 72, respectively, of separating means 70. Separating means 70 is coupled to combining means 40 through the recording medium.

Where the audio signal has been modulated with the luminance signal, the combined *L/A* signal is passed to a conventional signal separator 80 wherein the audio and luminance signals are separated into their original form, as shown.

The CR signal is passed to dematrixing means 90. Dematrixing means 90 separates the combined CR signal into a pair of chroma difference signals (*B*—*Y* and *R*—*Y* in the embodiment illustrated) together representative of the color information of a color television signal. The dematrixing means 90 has a first output means 100 and a second output means 110, one for each of the *B*—*Y* and *R*—*Y* chroma difference signals, respectively. These signals are capable of being processed in a color television receiver.

Referring in more detail to matrixing means 30, preferably an electronic switch is employed. The combined signal at the output represents the pair of chroma difference signals at the input on a time-shared basis. The preferred embodiment selected for illustration in the drawing employs a pair of insulated gate field effect transistors 31 and 32 for the electronic switch. These are conventional three electrode devices each having a pair of terminals, one being a drain terminal labeled "D" and the other a source terminal labeled "S." Each transistor also has a gate terminal designated by a short line parallel to the longer line designating the body of the device. The separation between the gate terminal and the body is illustrative of the fact that the gate is insulated from the body. It must be pointed out that there are other circuits which are equally capable of performing the function of an electronic switch. Diode matrices or other electronic switching devices can easily be substituted for the illustrated matrixing means employing insulated gate field effect devices. The matrixing means merely switches between the signal at one terminal of the input means 10 to the matrixing means (for example the *B*—*Y* signal) and the signal at the other terminal of the input means 10 (for example the *R*—*Y* signal). The terminals of input means 10 are coupled to the drain terminals of transistors 31 and 32. The matrixing means includes a means for switching the transistors on and off alternately at one-half the horizontal scan rate of the television signal, or 7,875 c.p.s., coupled to the gate terminals of the transistors. Timing generator 33 includes a conventional multivibrator triggered by the horizontal sync pulses of a television receiver which are passed to generator 33 through terminal **33*a*. The output signal from generator 33 determines the switching rate by supplying a pair of square waves, one pulse being 180° out of phase with the other. While one is + the other is —. Accordingly, when a pulse of one predetermined polarity selected according to the polarity type of insulated gate field effect transistor employed appears on the gate of transistor 32, such device will be turned on. At the same time, a pulse of the opposite polarity appears at the gate of transistor 31**. At the same time, therefore, that device will be turned off. During the time period of such pair of pulses, the *R*—*Y* signal (coupled to the drain of the "ON" transistor 32) will appear at the CR output of the matrixing means. When the polarity of the pulses changes, as it does 7,875 times per second, transistor 31 is turned on and transistor 32 is turned off. Accordingly, the *B*—*Y* signal (coupled to the drain of the "ON" transistor 31) appears at the output as the CR signal during this period of time. In the illustrated embodiment, matrixing means 30 also includes conventional amplifiers 34 and 35 and coupling capacitors 36 and 37 coupling input terminals 10 to the drains of transistors 31 and 32. These amplifiers and capacitors are by no means an essential aspect of the invention, but are used in a preferred embodiment. In the illustrated embodiment, the drain terminal of device 31 is coupled through amplifier 34 and capacitor 36 to the *B*—*Y* input terminal; similarly, the drain terminal of device 32 is coupled through capacitor 37 and amplifier 35 to the *R*—*Y* input terminal.

Combining means 40 has an inverting means for inverting the polarity of one of the first and second input signals at terminals 41 and 42. In the embodiment shown in the drawing, the signal at terminal 41 is inverted by inverting means, or transistor 43. The combining means 40 also includes a first summing means, preferably a linear summing means, for summing the first and second signals at input terminals 41 and 42.

In the illustrated embodiment, the first summing means includes NPN transistor 46. Transistors 43 and 46 together comprise a differential amplifier having a pair of differential inputs at their separate base terminals and a common mode input at their connected emitters. Transistor 45 acts as a constant current source to improve the common mode rejection of the differential amplifier comprised of transistors 43 and 46. The output signal current at the collector of transistor 45, representing the voltage *L/A* is passed to terminal 44. It is there summed with the CR signal current at the emitter of transistor 43. The signal at the output (the collector) of the first summing and inverting transistor 46 represents the sum of the *L/A*+CR signal. In addition to acting as an inverting means for the CR signal at its base, NPN transistor 43 also acts as a second summing means for summing the inverted CR signal appearing at its collector with the —*L/A* signal current appearing at its emitter or +*L/A* voltage at its collector. The summed *L/A*—CR signal appears at the output, or collector, of transistor 43. Resistors 47 and 48 are load resistors for transistors 43 and 46, respectively, and are connected between the collectors of these transistors and B+, the power supply voltage. Resistors 45*a*, 45*b*, and 45*c* are biasing resistors for transistor 45, and capacitor 49 is a conventional signal coupling capacitor. All of the transistors 43, 45, and 46 are NPN transistors (although polarities may easily be reversed with appropriate bias changes). Transistor 46 has its base coupled to ground. Resistor 45*b* couples the base of transistor 45 to ground.

Other types of combining means may be used without departing from the scope of the invention. For example a video transformer, although more costly, can be connected in a fashion well known in the art, which transforms two signals at its input to a pair of signals at the output, one representing the sum and the other the difference of the input signals. Accordingly any combining means producing the requisite output signals related in the manner discussed above may be employed in this invention.

The CR and *L/A* signals appear at input terminals 41 and 42, respectively, of combining means 40. Combining means 40 is a means for combining the first and second signals (the CR and *L/A* signals respectively) into a pair of signals adapted to be recorded and reproduced on a recorder. This pair of signals appears at the output lines 51 and 52 of combining means 40. Both signals of this pair of signals at output lines 51 and 52 represent at least a portion of the *L/A* signal at the second input terminal 42. Moreover, at least one of the pair of signals at output lines 51 and 52 represents at least a portion of the CR signal at the first input terminal 41. Both of the signals at lines 51 and 52 together represent both the signals at input terminals 41 and 42. Combining means 40 is adapted so that the sum of the pair of signals at output lines 51 and 52 represents the signal at the *L/A* second input terminal 42 also and is substantially unaffected by the CR signal at the first input terminal 41, whereby the pair of signals on lines 51 and 52 may be recorded and reproduced separately or in combination and still represent useful information.

The output signal *L/A*+CR appears at line 51 and the signal *L/A*−CR appears at line 52. Note that each of these signals at the output lines represents at least a portion of the *L/A* and CR signals at input terminals 41 and 42. Moreover, both of these signals represents a portion of the *L/A* signal at input terminal 42 and both together represent both of the signals at input terminals 41 and 42. Combining means 40 is adapted so that the sum of the output signals at lines 51 and 52 represents the signal at the second input terminal 42 alone. Note that the sum of $(L/A+\mathrm{CR})+(L/A-\mathrm{CR})$ equals a function of *L/A* alone (i.e. 2*L/A*). Such a combined signal is substantially unaffected by the CR signal at the first input terminal 41. The two signals at lines 51 and 52 may be recorded separately or in combination and still represent useful information. If they are recorded separately, they can be reproduced to produce both the *L/A* and the CR signals, as will be explained later. If they are recorded in combination, they can be reproduced to produce the *L/A* signal although the CR signal will be lost. However, for monochrome television display, the *L/A* signal alone represents useful information.

The signals at lines 51 and 52 are recorded in recording means 50 and are reproduced in reproducing means 60, as was discussed above. The reproduced signal at lines 61 and 62 should correspond as closely as possible to the recorded signals from lines 51 and 52. The signals on lines 61 and 62 are passed to separating means 70 for separating them into two signals separately representing the signals at the first and second input means 41 and 42, respectively. Separating means 70 has a first output terminal 71 wherein substantially the same signal as appeared at terminal 41 before recording appears. Similarly, at output terminal 72, the same signal as appears at terminal 41 before recording appears. Thus the signal at terminal 71 is the *L/A* signal and the signal at terminal 72 is the CR signal. These signals are adapted to be processed by a color television receiver.

Separating means 70 includes a first summing means comprising resistors 73 and 74. The reproduced signals on the lines 61 and 62 appear at the separated terminals of resistors 73 and 74. The combined signal resulting from linearly summing the signals on lines 61 and 62 appears at terminal 71 which is at the junction of resistors 73 and 74. Since the signals at lines 61 and 62 are the *L/A*+CR and *L/A*−CR signals, respectively, the combined signal at terminal 71 representing the sum of these two signals is the *L/A* signal alone, the CR signal cancelling out. The signal on line 61 is also passed directly to the emitter of NPN transistor 75; the signal on line 62 is also passed directly to the base of NPN transistor 76. Transistors 75 and 76 together represent a differential amplifier. Resistor 77 is a base-biasing resistor for transistor 75 and resistor 78 is a collector load resistor for transistor 75. Resistors 77, 77*a*, and 78 are coupled between the base and collector, respectively, of transistor 75 and the B+ and B− power supply terminals, as shown. The difference output signal from the differential amplifier appears at terminal 72 which is connected to the common collectors of the differential transistors 75 and 76. This difference signal results from the signal on line 62 being inverted by transistor 76. Thus the inverted signal CR−LA appears at the collector of transistor 76, and is added at terminal 72 to the *L/A*+CR signal at the collector of transistor 75. Accordingly, $(L/A+\mathrm{CR})+(\mathrm{CR}-L/A)$ equals a function of the CR signal alone (i.e. 2CR). The resulting CR signal appears at terminal 72.

The *L/A* signal at terminal 71 is passed to a signal separator 80 for separation of the audio and luminance components, as discussed above. The CR signal at terminal 72 is passed to a dematrixing means 90 which separates the CR signal into its original chroma difference compounds $B-Y$ and $R-Y$. The CR signal is passed through two parallel paths. The first path passes through delay line 81 which delays the signal for 63.5 microseconds (the duration of one line scan on a conventional television receiver). The output of delay line 81 is coupled to the input or drain terminals of insulated gate field effect transistors 82 and 83. The parallel line from terminal 72 which does not go through delay line 81 is coupled to the drain terminals of insulated gate field effect transistors 84 and 85. Insulated gate field effect transistors 82 and 84 have common gates, as shown, as do transistors 83 and 85. Each of these pairs of common gates is connected to a separate terminal of timing signal generator 86. As shown, one of the square wave output signals from generator 86 is out of phase with the other by 180°. This generator is the same as generator 33 and divides in half the horizontal sync pulses from the television receiver which appear at terminal 86*a*. The output square wave signals, obtained by dividing the sweep frequency in half, result in a switching rate of devices 82–85 of 7875 cps. Accordingly, one pair of insulated gate field effect transistors is turned on while the other pair is turned off. Furthermore, the source terminal of insulated gate field effect transistor 84 is connected to the source terminal of insulated gate field effect transistor 83; the source terminal of insulated gate field effect transistor 82 is connected to the source terminal of insulated gate field effect transistor 85. Output terminal 100 of the dematrixing means 90, the first output means, is coupled to the common sources of insulated gate field effect transistors 82 and 85; output terminal 110, the second output means, is coupled to the common sources of insulated gate field effect transistors 83 and 84. The $B-Y$ signal appears at terminal 100 and the $R-Y$ signal appears at terminal 110. Thus terminal 110 is the first output means of the system of this invention and terminal 110 is the second output means. Dematrixing means 90 works in the opposite but analogous fashion to matrixing means 30. Insulated field effect transistors 82–85 separate the combined CR signal into the separte chroma difference signals. The input to the transistor matrix at the drain terminals of transistors 84 and 85 is the combined CR signal; the combined CR signal, delayed by one line or 63.5 microseconds appears at the drain terminals of transistors 82 and 83.

Dematrixing means 90 actually only uses every other 63 microsecond line of each of the chroma information signals $B-Y$ and $R-Y$. Each of the signals passed to the signals passed to the pairs of common drain terminal of the insulated gate field effect transistors actually represent only every other line as a result of the one-line delay 81. However the lack of every other line in fact does not detract appreciably from the reproduced picture. Although one-half of the vertical chroma resolution is lost, the remaining one-half still exceeds the limits of visual acuity. The eye is unable to detect the fine differences between a system reproducing every chroma line and the system of the subject invention which reproduces every other chroma line on the vertical scale because the eye is less sensitive to color difference than it is to luminance resolution.

From the above detailed description, it should be apparent that the system of this invention is particularly adapted to the recording of color television signals. However, it is no means limited to such recording. Any two signals may be passed to terminals 41 and 42 which may be combined into a pair of signals, one representing the sum of the signals at terminals 41 and 42, and the other representing the difference. Accordingly, a multiplex stereo signal may be recorded using the system of this invention. In such an application, the monophonic signal would be passed to terminal 42 and the difference signal (the difference between the signal on the right speaker and the signal on the left speaker) would be passed to terminal 41. The R and L signals, respectively, appear at lines 51 and 52. These are then recorded on a single split track in a preferred embodiment of the invention rather than on two separate tracks as is normally done in the prior art. Normal recording speed for stereophonic signals is 7½ i.p.s.; on the other hand, with television signals, the recording tape speed is generally 60 or 120 i.p.s. using quarter inch tape. A compatible recorder thus operates at either speed.

By way of illustration and example only, the following are representative circuit values for the components shown in the drawing:

| | |
|---|---|
| Capacitors: | |
| 36 | μf 25 |
| 37 | μf 25 |
| 49 | μf 10 |
| MOS devices: | |
| 31 | Fairchild 2N4066 |
| 32 | Fairchild 2N4066 |
| 82 | Fairchild 2N4066 |
| 83 | Fairchild 2N4066 |
| 84 | Fairchild 2N4066 |
| 85 | Fairchild 2N4066 |
| Transistors: | |
| 43 | Fairchild 2N2219 |
| 46 | Fairchild 2N2219 |
| 46 | Fairchild 2N2219 |
| 75 | Fairchild 2N2219 |
| 76 | Fairchild 2N2219 |
| Resistors: | |
| 47 | 1.2KΩ |
| 48 | 1.2KΩ |
| 45*a* | 1Ω |
| 45*b* | 1KΩ |
| 45*c* | 2.4KΩ |
| 73 | 8KΩ |
| 74 | 8KΩ |
| 77 | 10KΩ |
| 77*a* | 30KΩ |
| 78 | 82Ω |

Thus the system of this invention can be used for music or other stereophonic recording as well as for recording television signals, either color or monochromatic. Prerecorded conventional four track tapes may be played back on the system of this invention, although because of the split track heads employed for television, special heads would be required to reproduce such tapes in their stereophonic mode. However, the split track heads used in the recording and reproducing means of this invention may be used to play back prerecorded stereo tapes, if desired, although the resultant output signal will be monophonic.

The system of this invention has many advantages. In addition to its compatability for color and monochromatic television and for stereophonic recording, the combining means and separating means of this invention themselves have advantageous characteristics for recording. For example, the skew tolerance of the recorder and reproducer can be relaxed because any change in tape azimuth merely results in a reduction in resolution, not in signal/noise ratio. This is true either for color or monochromatic recording. Thus a significant improvement in signal/noise ratio can be obtained using the system of this invention. There is essentially no reduction in recording level of a monochrome signal using the system of this invention over the system of the prior art, described in copending application Ser. No. 374,632 filed June 12, 1964 now Patent No. 3,335,218, and assigned to the same assignee of this invention.

As will be apparent to one skilled in the art, many modifications from the preferred embodiment of the invention may be made by one skilled in the art without departing from the spirit and scope of the invention. Accordingly, the only limititations on the scope of this invention are expressed in the claims which follow.

What is claimed is:

1. A system for recording signals adapted to be displayed on the screen of a color television receiver for converting said signals to signals better adapted for recording, and for reconverting said signals substantially into their original form, which comprises:

first input means for receiving a pair of signals together representative of the chroma difference information of a color television signal;

matrixing means coupled to said first input means for combining said pair of signals into a combined signal which is capable of being reconverted substantially to said pair of signals;

second input means for receiving a signal representative of luminance information;

combining means coupled to said matrixing means and said second input means for further combining said combined signal and said signal representing luminance information;

recording means coupled to said combining means for recording said further-combined signal onto a recording medium;

reproducing means for reproducing said further-combined signal from said recording medium;

separating means coupled to said reproducing means for separating said combined signal from said further-combined signal;

dematrixing means coupled to said separating means for separating said combined signal substantially into said pair of signals together representative of the chroma difference information of a color television signal, said dematrixing means having first and second input means individual to said pair of signals, said pair of signals being capable of being processed in a conventional color television receiver.

2. The recording system of claim 1 further characterized by said matrixing means including an electronic switch, whereby the combined signal output represents said pair of signals on a time-shared basis.

3. The recording system of claim 2 further characterized by said electronic switch operating at one-half the line scan rate of said color television signal.

4. The recording system of claim 2 further characterized by said electronic switch including: a pair of insulated gate field-effect transistors each having a pair of terminals, one being a source and the other a drain, and a gate input terminal, one of said pair of signals being coupled to one of said pair of terminals of a different one of said transistors, respectively; and a means coupled to said gate terminals of both said transistors for switching said transistors on and off at one-half the line scan rate of the television signal.

5. A system for processing signals to convert said signals to signals better adapted for recording, for recording the same and for reconverting said signals substantially into their original form, which comprises:

first input means for receiving a first signal;

second input means for receiving a second signal;

combining means coupled to said first and second input means for combining said first and second signals into a pair of signals adapted to be recorded and reproduced on a recorder, both of said pair of signals representing at least a portion of the signal at said second input means, at least one of said pair of signals representing at least a portion of the signal at said first input means, and both of said signals together representing said signals at said first and second input means, said combining means being so proportioned that the sum of said pair of signals represents the signal at said second input means alone and is substantially unaffected by the signal at said first input means, whereby said pair of signals may be recorded and reproduced separately or in combination and still represent useful information;

recording means coupled to said combining means for recording said pair of signals onto a recording medium;

reproducing means for reproducing said pair of signals from said recording medium; and separating means coupled to said reproducing means for separating said pair of signals into two signals separately representing the signals at said first and second input means, said separating means having first and second output means for each of said two signals, whereby said two signals are then adapted to be utilized by signal transducers.

6. The processing system of claim 5 further characterized by said combining means including an inverting means for inverting one of said first and second signals, a first summing means for summing said first and second signals, and a second summing means for summing the signal inverted by said inverting means with the other of said first and second signals.

7. The processing system of claim 6 wherein each of said summing means is a linear summing means.

8. The processing system of claim 6 wherein said summing means and said inverting means comprise a differential amplifier having a pair of differential input terminals and a common mode input terminal.

9. The processing system of claim 8 wherein one of said inputs for receiving said first and second signals is said common mode input terminal and the other is one of said pair of differential inputs.

10. In a recording system, a signal processor for processing signals adapted to be displayed on the screen of a color television receiver to convert said signals to signals better adapted for recording and to reconvert said signals into signals adapted for processing by a color television receiver, which comprises:

first input means for receiving a signal representative of the chroma difference information of a color television signal;

second input means for receiving a signal representative of the luminance information of a television signal;

combining means coupled to said first and second input means for combining the signals at said first and second input means into a pair of signals adapted to be recorded and reproduced on a recorder, both of which pair of signals representing at least a portion of the signal at said second input means, at least one of which representing at least a portion of the signal at said first input means, and both of which together representing said signals at said first and second input means, said combining means being so proportioned that the sum of said pair of signals represents the signal at said second input means alone and is substantially unaffected by the signal at said first input means, whereby said pair of signals may be combined without loss of said luminance information; and separating means coupled to said combining means for separating said pair of signals into two signals separately representing the original signals at said first and second input terminals, said separating means having first and second output means for each of said two signals, said signals then being adapted to be processed by a color television receiver for faithful reproduction.

11. The signal processor of claim 10 further characterized by said second input means receiving a signal representative of both said luminance information and the audio information and said separating means providing a signal which may be separated into said luminance and said audio signals.

12. The recording system of claim 10 further characterized by said combining means including an inverting means for inverting one of said first and second signals, a first summing means for summing said first and second signals, and a second summing means for summing the signal inverted by said inverting means with the other of said first and second signals.

13. The recording system of claim 12 wherein each of said summing means is a linear summing means.

14. The recording system of claim 12 wherein said summing means and said inverting means comprise a differential amplifier having a pair of differential input terminals and a common mode input terminal.

15. The recording system of claim 14 wherein one of said inputs for receiving said first and second signals is said common mode input terminal and the other is one of said pair of differential inputs.

16. A system for recording signals adapted to be displayed on the screen of a color television receiver for converting said signals to signals better adapted for recording, and for reconverting said signals substantially into their original form, which comprises:

first input means for receiving a pair of signals together representative of the chroma difference information of a color television signal;

matrixing means coupled to said first input means for combining said pair of signals on a time-sharing basis into a combined signal which is capable of being reconverted substantially to said pair of signals;

recording means coupled to said matrixing means for recording said combined signal onto a recording medium;

reproducing means for reproducing said combined signal from said recording medium;

dematrixing means coupled to said reproducing means for separating said combined signal substantially into said pair of signals together representative of the chroma difference information of a color television signal, said dematrixing means having first and second input means individual to said pair of signals, said pair of signals being capable of being processed in a conventional color television receiver.

17. The recording system of claim 16 further characterized by said matrixing means including an electronic switch, whereby the combined signal output represents said pair of signals on a time-shared basis.

18. The recording system of claim 17 further characterized by said electronic switch operating at one-half the line scan rate of said color television signal.

19. The recording system of claim 17 further characterized by said electronic switch including: a pair of insulated gate field-effect transistors each having a pair of terminals, one being a source and the other a drain, and a gate input terminal, one of said pair of signals being coupled to one of said pair of terminals of a different one of said transistors, respectively; and a means coupled to said gate terminals of both said transistors for switching said transistors on and off at one-half the line scan rate of the television signal.

References Cited

UNITED STATES PATENTS 3,372,228 3/1968 Law.

ROBERT L. GRIFFIN, *Primary Examiner.*

R. MURRAY, *Assistant Examiner.*

U.S. Cl. X.R.

178—5.4